United States Patent [19]

Vertova

[11] 4,330,317
[45] May 18, 1982

[54] METHOD AND MACHINE FOR MAKING VIALS FROM GLASS TUBING

[76] Inventor: Ermanno Vertova, Via Casnida, n° 2, 24047 Treviglio (Bergamo), Italy

[21] Appl. No.: 204,448

[22] Filed: Nov. 6, 1980

[30] Foreign Application Priority Data

Nov. 27, 1979 [IT] Italy ................................ 2936 A/79

[51] Int. Cl.³ ...................... C03B 23/08; C03B 23/09; C03B 23/11
[52] U.S. Cl. .......................................... 65/29; 65/104; 65/105; 65/108; 65/109; 65/158; 65/162; 65/271; 65/272; 65/279; 65/283; 65/292
[58] Field of Search ................... 65/29, 104, 105, 108, 65/109, 113, 120, 158, 162, 271, 272, 276, 279, 283, 284, 285, 292

[56] References Cited

U.S. PATENT DOCUMENTS

| | | | |
|---|---|---|---|
| 1,962,985 | 6/1934 | Dichter | 65/283 X |
| 2,582,818 | 1/1952 | Coby | 65/113 X |
| 4,080,189 | 3/1978 | Dichter | 65/276 |

*Primary Examiner*—Richard V. Fisher

[57] ABSTRACT

Method and machine for making vials from glass tubing, wherein at least one glass tube (22) with closed bottom is loaded on a rotatable plate (11), having a series of holes circumferentially passing therethrough, and is then grasped by upper pliers (23'), provided on a plane not coincident with the rotatable plate (11), and then grasped by lower pliers (23) also provided on a horizontal plane not coincident with a lower rotatable plate (10), the tube (22) being continuously rotated on its axis by rotating elements of the pliers (23, 23'), and rotated throughout the circumference of the machine by rotation of the suitably controlled rotatable plates (10, 11). In this rotation the tube, as drawn or pulled at suitable intervals by the pliers, is caused to pass in front of a series of burners (17) arranged in suitable number on the entire periphery of the machine, such burners being provided with parabolic arc flames. Each of the vial forming tubes also passes in front of a feeling and controlling station (20) measuring and checking the formed roughshaped piece and in some cases causing a further correcting burner (17) to operate. After release from the pliers, the finished vials fall down through holes (3) provided in a base plane (2) into small boxes in the bedplate (1) of the machine.

7 Claims, 19 Drawing Figures

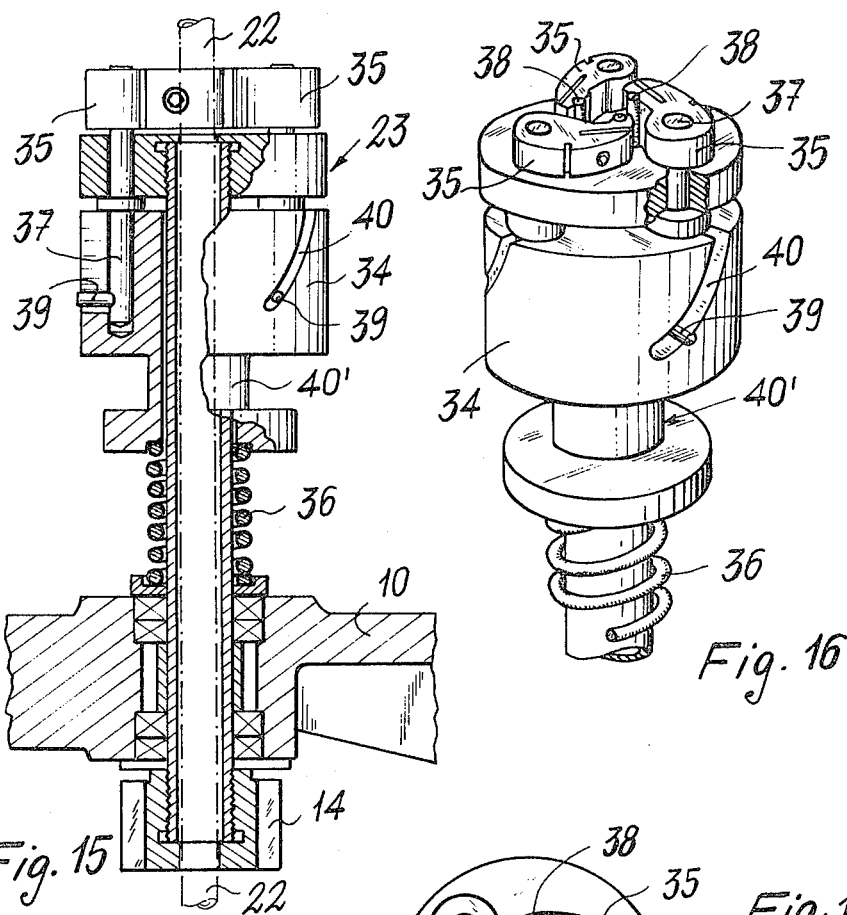
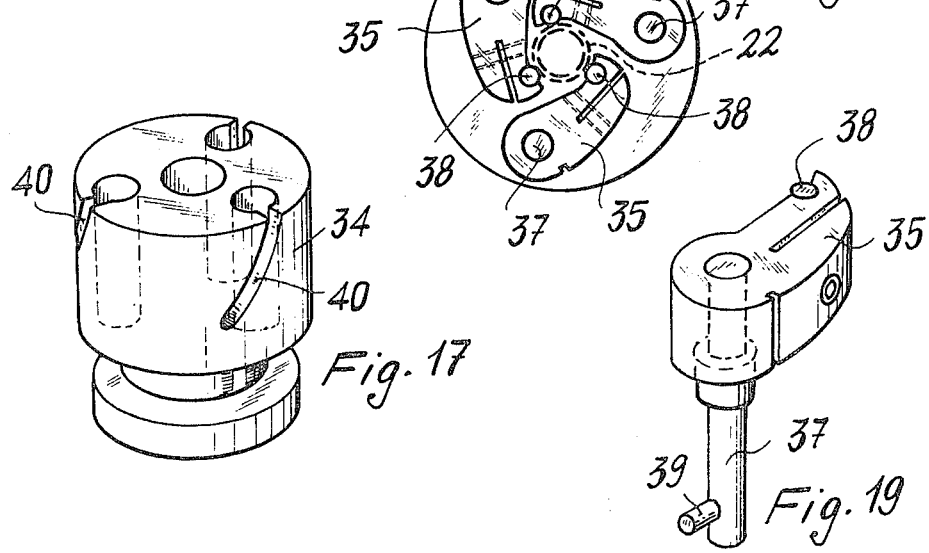

METHOD AND MACHINE FOR MAKING VIALS FROM GLASS TUBING

This invention relates to a method and machine for making glass vials from glass tubing, wherein the rough-shaping and forming operations are continuously carried out by causing the glass tube to pass in front of several stations, while the tube is grasped by pliers outside of the rotatable plate carrying the tube, a station of mechanical control being also provided for any correction of measure faults.

As well known, for vial production from glass tubing, the tube is loaded onto the head of a rotating machine and then, while rotating on itself, the tube is heated to its softening point by a flame beam and pulled along its major axis for elongation and spreading of that portion which has been subjected to heat softening. Hitherto, the prior art machines provided that spindles should be arranged onto a head of a rotating machine, in turn such spindles being rotating on themselves, at upper and lower positions, the lower spindles being slidably mounted with respect to the vertical axis. By falling the tubes moved through such hollow spindles and were loaded on the machine for undergoing any successive workings.

In the prior art machines, the hollow spindles which acted as pliers, were necessarily of a substantial dimension, which tended to increase the size of all the supporting and driving members and rotating heads as well, thereby unduly increasing the overall dimensions of the machine. Since, for obvious space considerations, unduly large machines result in a reduction in the number of processing stations, the output capacity of a factor of given size is reduced. Additionally, such prior art machines are of poor versatility. For example, they do not control and operate on the product quality. That is to say, they do not correct any faults or differences after rough-shaping operation. The ensuing disadvantage is then production is uneven. The need arises in the successive vial processing systems of providing sophisticated and expensive equipment for distinguishing among the various types of vial which very often have then to be discarded.

Therefore, it can be stated that the prior art machines for the production of vials from glass tubing suffered from a whole series of disadvantages, such as follows:

machines that were too large and too heavy; too expensive; pliers that were too expensive or too large, or spaced too far apart from one another, with increase in cost; too much idle time; need of providing additional tracking mechanisms at the stations, with resulting enormous peripheral speeds, and wear; enormous metal mass to be heated with accompanying degradation also of ambient work conditions, and further similar drawbacks.

It is the object of the present invention to provide a method and machine for simply and economically eliminating the above mentioned disadvantages and particularly increasing the capacity of the machine, providing a high quality product in which, when working is being carried out, the rough-shaped product can be operated on so as to correct any faults or differences, so that all of the vials being obtained are within a single standard standardization range which may be varied as required.

To this end, the invention provides that at least one closed bottom glass tube is loaded on a rotatable plate having a series of holes passing circumferentially therethrough, and is then grasped by upper pliers provided on a plane not coincident with the rotatable plate, and then grasped by lower pliers also provided on a horizontal plane not coincident with a lower rotatable plate, the tube being continuously rotated on its axis by rotating elements of the pliers, and rotated throughout the circumference of the machine by rotation of the suitably controlled rotatable plates. In this rotation the tube, as drawn or pulled at suitable intervals by the pliers, is caused to pass in front of a series of burners arranged in a substantial number on the entire periphery of the machine, such burners being provided with parabolic arc flames. Each of the vial forming tubes also passes in front of a feeling and controlling station measuring and checking the formed rough-shaped piece and causing a correction burner to be operated when a rough-shaped piece is outside specifications. After release from the pliers, the finished vials fall down through holes in a base plane into small boxes in the machine bedplate.

The invention will now be further described with reference to an unrestrictive embodiment thereof, to be considered in connection with the accompanying drawings, in which:

FIGS. 15 through 19 are various views showing a second type of gripping pliers.

Figure 1:
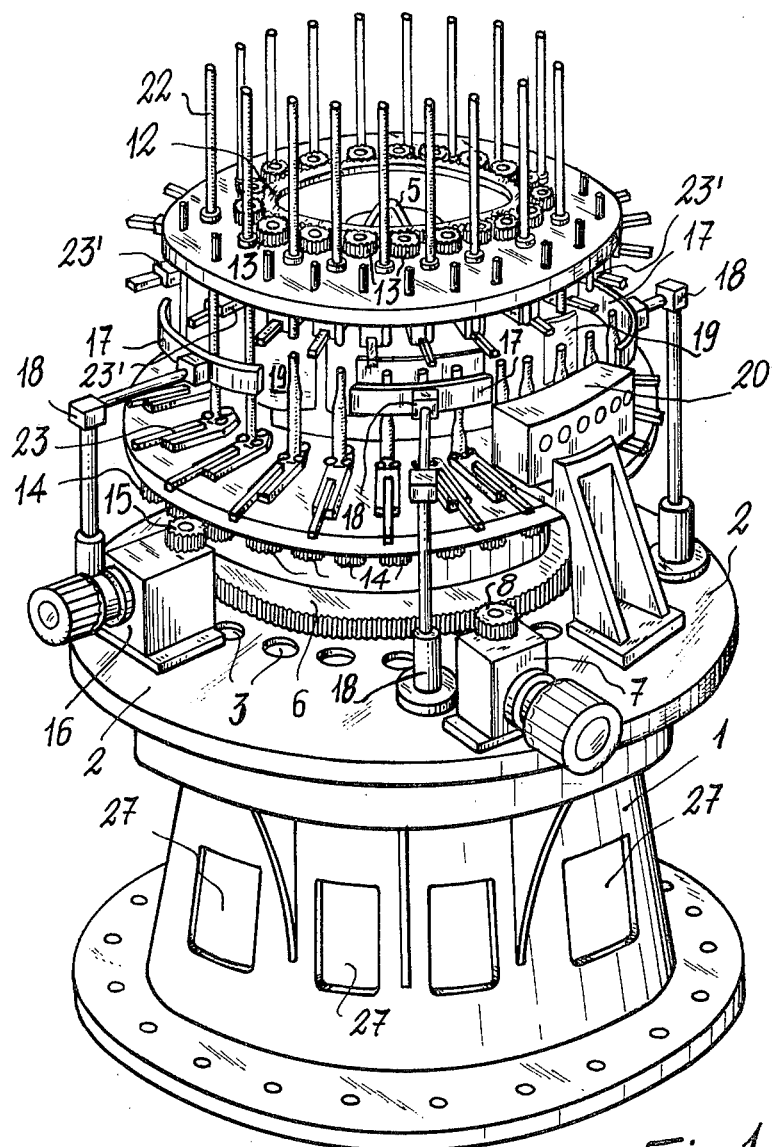
FIG. 1 is a diagrammatic perspective view of the machine.
Figure 2:
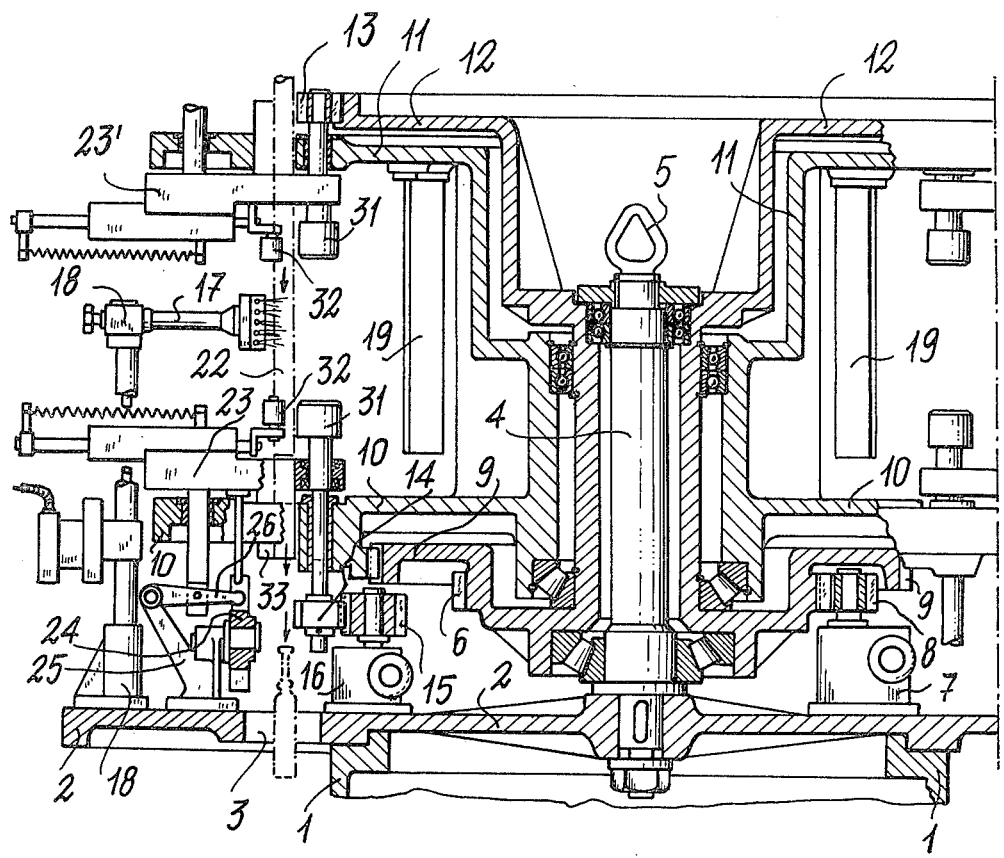
FIG. 2 is a sectional view taken at the side of the rotating elements and pliers with the burners.
Figure 3:
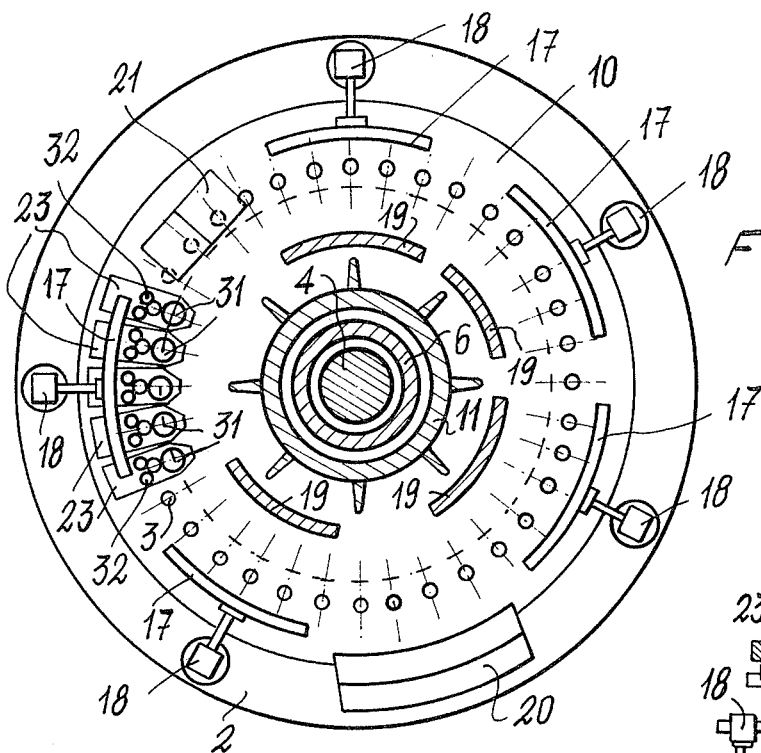
FIG. 3 is a plan view of the machine.

Referring now to the drawings, and particularly to FIGS. 1, 2 and 3, reference numeral 1 denotes the machine bedplate, in which a series of small boxes 27 for vial collection is provided. A plane 2 is provided on said bedplate 1, and hereinafter will be referred to as base plane, on which a series of circumferentially arranged holes 3 is provided. Reference numeral 4 denotes a stationary central shaft which at its end has a lifting eyelet 5. Reference numeral 6 denotes an outer toothing crown gear for actuating a lower inner toothing rotatable plate 10. At 11 there is shown an upper rotatable plate integral with said lower rotatable plate 10. Reference numeral 12 denotes an upper crown gear integral with said lower crown gear 6, which upper crown gear 12 performs the function of actuating a series of small pinions 13 for the control of rollers of upper gripping pliers shown at 23'. Reference numeral 14 denotes a series of small pinions for an assembly of lower pliers having the reference numeral 23. The small pinions 14 are driven by a drive gear wheel 15 operated by a geared motor 16 of its own. At 17 burners are shown, in which the nozzles and accordingly the flames are arranged on an arc of circle or on a parabolic arc, said burners being suitably supported on their supports or bearings 18 and circumferentially arranged in a substantially number throughout the machine circumference, a breakfire or firequard 19 being placed in front of each burner.

Reference numeral 20 denotes diagrammatically a mechanical feeling unit comprising small pins which, by projecting and retracting, are capable of feeling the vial to check its size. Unit 20 provides a successive control, in this case, for the possible operation of a further size correcting burner. Such a mechanical feeling unit may be, for example, go/no-go type gauge. Preferably, such a unit comprises a series of projecting pins which, by coming or not in contact with the vial body, may cause or not the operation of the next correction station.

Reference numeral 21 (FIG. 3) shows a bearing cap on which the lower end of the glass tube 22 initially bears before being gripped by the lower pliers 23.

Figure 4:
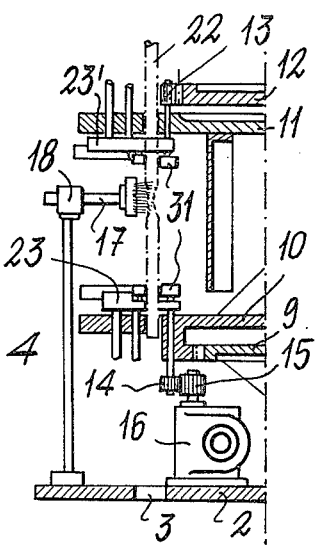
FIGS. 4 and 5 are two partly sectional views at the zone of a burner and at the descent zone of the glass tube.
Figure 5:
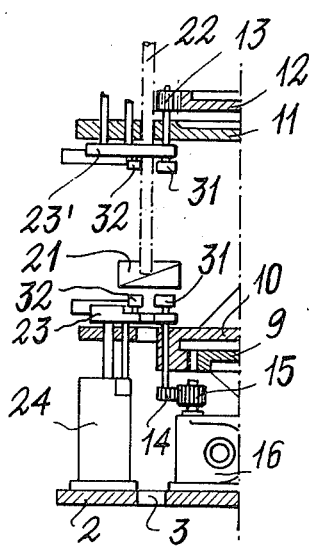

Now, by briefly referring to FIG. 5 in connection with FIG. 2, reference numeral 24 of FIG. 5 and elements 24, 25 and 26 of FIG. 2 show a kinematic mechanism of known construction for the lifting and lowering of the lower pliers 23. By a known operation, such a lifting and lowering movement enables the heated glass tube to be drawn as the vial is being formed as is depicted by FIG. 4.

The forming steps are schematically shown in FIGS. 6 through 10.

Figures 6, 7, 8, 9:
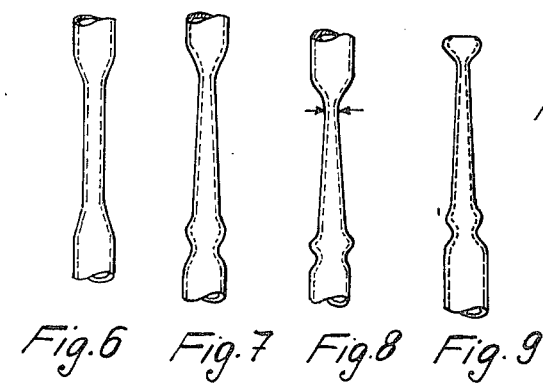
FIGS. 6 through 10 are views schematically showing some processing steps of the glass tube for the production of a vial.

As clearly shown in FIG. 6, on passing in front of a first burner, a length of tube is heated and thinned by drawing it at a zone thereof which, in the following steps depicted by FIGS. 7-10, the neck is formed, the vial is separated, and the bottom for the next vial is formed.

Figure 14:
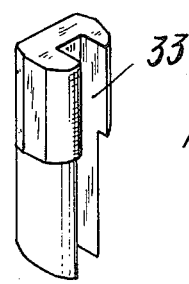

Referring now to FIGS. 11 through 14, the configuration will be briefly described for a first type of lower pliers 23, also the upper pliers 23' being identical, with the exception of being arranged is an overturned position. In the case of the lower pliers, the drive for the small pinions 14 is through the geared wheel 15 by its own geared motor 16, while in the case of the upper pliers 23' the drive for the small pinions 13 is taken from the crown 12 integral with the lower crown 6 driven through the element 8 by the geared motor 7. As will be seen from said FIGS. 11 through 14, each pliers comprise a pliers body 28 carrying a sprung pushing element 29 which can be adjusted by locking device 30. Such a pushing element 29 serves the purpose of pushing the tube 22, intended for forming the vial, against a driving roller 31. Roller 31 cooperates with two idle rollers 32 so that said glass tube 22 can be continuously rotated on itself. In this case, the rotational drive is through said small pinions 14, gear 15 and geared motor 16. For the upper rollers such a rotational drive occurs through small pinions 13 and accordingly is under the action of the geared motor 7. As a result, said tube 22 is continuously rotated on itself so that, when passing in front of the flame, it will be positioned at a predetermined level or height throughout its circumference. In FIG. 14 a grooved guide element 33 is shown which serves the purpose of keeping perfectly vertically aligned said tube 22 in said pliers 23. As previously stated, said pliers 23 can be lifted and lowered, and can be also opened and closed by means of said elements 24, 25 and 26.

Instead of the pliers shown in connection with FIGS. 11 through 14, use could also be made of a type of pliers as shown in connection with FIGS. 15 through 19. Also such pliers are denoted as a whole at 23 (FIG. 15), thus referring to lower pliers as shown in FIG. 1. Reference numeral 10 still denotes the lower rotatable plate. Reference numeral 14 still denotes the small pinion for the control of the rotation. Reference numeral 34 denotes the upper gripping head for each pliers, which has a bore for the passage of tube 22; the top of head 34 carries three jaws 35 pivoted at 37, each terminating with a gripping end and a respective roller 38. Said head 34 is sprung at 36. A stake 39 is provided on the pin 37 of each jaw 35 for sliding in a cam groove 40 of head 34. A lifting and lowering fork is provided for engagement in a space 40' under said head 34. As a result, the whole unit causes through said gear 14 the glass tube 22 to rotate as gripped between the jaws 35 in rollers 38. Upon sliding of pin 39 in said cam guide 40', the lifting and lowering fork causes the opening and closure of jaws 35, just as in the case of the type of pliers previously described in connection with FIGS. 11 through 14. In summary, the pliers are arranged outside of the rotatable plates 10 and 11, and accordingly do not adversely affect the machine size, but tend to reduce the same. Such pliers further allow said tube 22 to rotate on itself and can be lifted and lowered, and of course opened and closed, to be effective at suitable intervals to impart the drawing action to the tube and release the already formed vials and grip again the tube 22 being processed.

Although clearly apparent from the foregoing description and illustration, the operation and operative cycle of the machine will now be briefly summarized. The closed bottom glass tube 22 is loaded on the plate 11 at a starting station corresponding to the bearing cap shown at 21. The tube is gripped by a pliers 23' to fall down on said cap 21. Of course, such a cap is adjustable in height, and is secured to an outer non-rotating support. The upper pliers close, pressing said tube 22 before the cap 21 is cleared off thereunder by rotation. As a result, a length of tube 22 on which the vial is to be formed, will outwardly project. On this length of tube 22, having the desired extension, the pipe (see FIG. 6) is to be formed, whereby the tube length is invested by a flame sector or burner 17, while at the same time the open lower pliers 23 move upward from the bottom by means of elements 24, 25 and 26, and stop at a predetermined height or level, so that on closing the portion of glass tube intended to form the vial body becomes captive. Now, the pipe portion is gripped by the two lower and upper pliers. A sector of burner 17 invests this length of glass tube, which continuously rotates on itself as above explained, and heats the glass for a period of time required to bring it to a suitable temperature to be drawn or pulled by the pliers. At the next station, a further burner 17 invests the tube portion at the joining between the vial body and pipe (FIG. 7) forming the so-called "vial neck," that is the shaping where the vial will then be broken without any use of file, when the vial will be used by the final user.

Figure 10:
Figure 11:
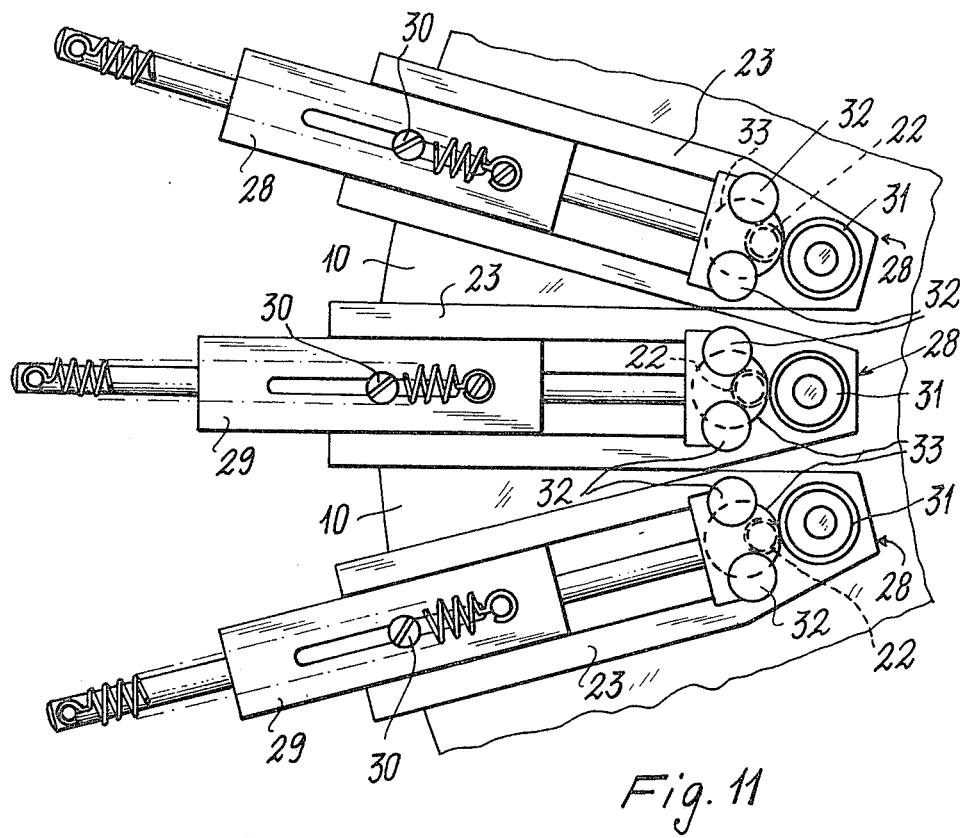
FIGS. 11 through 14 are various views showing a first type of gripping pliers.
Figure 12:
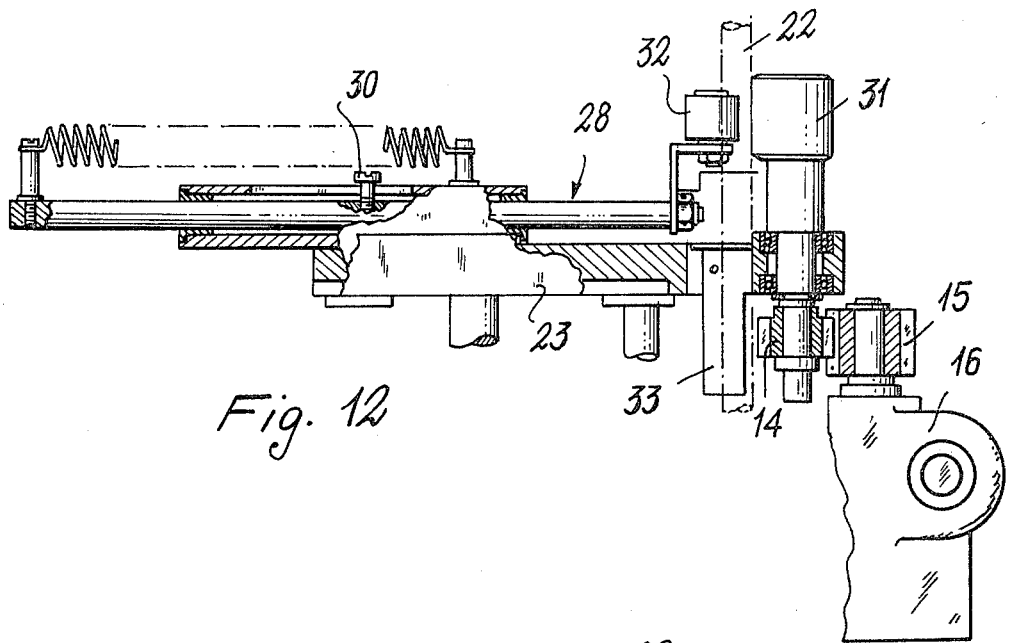
Figure 13:
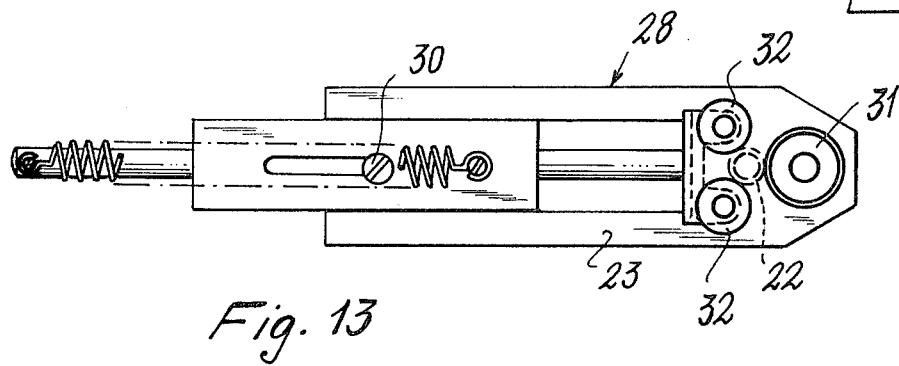

For the other stations, the pipe is allowed to cool, and is then felt in unit 20 by a series of go/no-go gauges, which will serve the purpose of enabling or not. Enabling is given for all of the dimensions exceeding a predetermined dimension, the term "enabling" being intended for the triggering of an enabling or gating signal for the operation of a further correcting burner. Therefore, for those pipes or vials that should be of a too large dimension, a further burner is operated for a controlled narrowing of the pipe to the acceptable measure or size, which is accordingly controlled by the above mentioned mechanical feeling pin. Once this pipe correcting or standardizing operation has been effected, as outlined in FIG. 8, the tube will then pass in front of so-called "cutting" burner sectors, and will then be separated from the tubing, as schematically shown in FIGS. 9 and 10, or the vial is provided, while the upper section of the tube remains closed and forms the bottom for the next vial. In effecting this vial separating operation, the lower pliers 23 are lowered by the lifting and lowering controls thereof and hold the vial captive, while the upper pliers 23' remain engaged on the tube length 22 which is still to be processed.

At the same time, on the lower pliers 23 adjacent the just separated pipe, a further burner is effective and causes by its action and angling the bursting of the top portion of the vial and formation of the collar (see top portion of FIG. 9), whereupon the lower pliers 23 open and allow the vial to fall synchronously down into the small boxes 27 through the holes 3. Before the new operative cycle is initiated, the tube 22 which with its bottom is still in the upper pliers 23' is invested by a further flame of a burner 17 having the purpose of "unstretching" that glass portion, thus rendering the tube, that is to say the tube bottom, quite suitable for a new cycle starting from cap 21.

Of course, provision will be made upstream and downstream of the described machine for various devices and equipments for loading and unloading operations, hoods, etc., it being however evident that such devices and equipments are not within the scope of the present invention.

It should be also noted that these so-called correcting burners will be more than one in number, particularly in accordance with the operating speed of the machine. Particularly, it is envisaged that the correcting burner is mounted on a carriage following a semicircular path with respect to the machine center, so that it can follow the pipe to be corrected for the time required for such a correction operation. It also derives that, although the operation has been herein described in connection with a single glass tube 22, the above described operations, also owing to the particular shape of burners 17, will simultaneously or in any case continuously occur on a plurality of successive tubes 22, thus substantially increasing the efficiency of the machine.

What I claim is:

1. A method for the production of vials from a glass tubing which is heated and pulled or drawn for the separation therefrom of shaped lengths intended to form the individual vials, characterized by comprising the continuous operating steps of loading at least one closed bottom glass tube on an upper rotatable plate, having holes circumferentially passing therethrough, and causing the tube to move down on a bearing cap, and then gripping the tube by upper and lower pliers, provided offset or staggered with respect to the upper rotatable plate and a lower rotatable plate, continuously rotating the tube on itself by means of rotating elements of said pliers and causing the tube to rotate on the entire circumference of a machine by rotation of said rotatable plates, passing the tube in front of a series of burners having the flames thereof arranged according to a circular or parabolic sector, softening the portions of the tubing confronting the flames of the burners, pulling or drawing the tube downward to form a pipe at the flame softened portion, forming a neck at the bottom portion of said pulled or drawn pipe by passage in front of a further burner, cooling the pulled or drawn tube in the machine and then causing said tube with the formed pipe to pass in front of a mechanical feeling station feeling the pipe and, in case of dimensions outside a predetermined range, operating a correcting burner which heats the incorrectly dimensioned pipe causing the narrowing thereof, subjecting the pulled or drawn pipe to a burner sector for cutting the pipe and separation of the vial which remains in the lower pliers, investing a tip of the vial with a flame to form the inlet of the vial, operating with a further flame on the tube length remaining in the upper pliers to form a new closed bottom for the next vial and then opening the lower pliers to point the formed vial to fall down through the circumferentially arranged holes into a bottom collecting means for transportation to further working stations, then resuming the cycle with the tube length in the upper pliers.

2. A machine for forming vials from glass tubing, wherein the glass tube is rotated on itself and throughout the machine circumference with flames operating for softening the glass and separating the individual vials from the glass tubing, characterized by comprising an upper rotatable plate and a lower rotatable plate, arranged on a stationary central shaft and integral with each other, having holes circumferentially passing therethrough, a stationary base plane on a frame provided with vial collecting boxes, which stationary base plane is similarly provided with a plurality of ring-arranged holes and corresponding to said holes of said rotatable plates, a series of upper gripping pliers at the upper rotatable plate and a series of lower gripping pliers at the lower rotatable plate, said gripping pliers being staggered relative to the horizontal plane defining the respective rotatable plate, a plurality of burners arranged at intervals along the machine circumference, and wherein each of said burners provides flames in a circular or parabolic sector, a mechanical feeling station for controlling the dimensions of the pipe formed on the tube length for the operation of a correcting burner, control means for the rotation of said rotatable plates, and control means for the rotation of elements rotating in said pliers in order to keep the glass tube continuously rotating on itself, mechanical means for lifting and lowering, as well as opening and closing said pliers, and means for synchronous movement of the entire machine unit.

3. A machine according to claim 2, characterized in that for the operation of said rotatable plates a drive unit is provided, rotating said plates by a crown gear and by a further crown gear rotating a series of pinions controlling the rotating elements of the upper pliers.

4. A machine according to claim 2, characterized in that for the control of the rotating elements of the lower pliers a further operating unit is provided, which by an associated gear wheel operates a series of control pinions for the rotating elements of the lower pliers.

5. A machine according to claim 2, characterized in that the lower and upper pliers comprise a drive roller and a sprung adjustable pushing element for pressing the glass tube against the drive roller, the latter cooperating with two idle rollers.

6. A machine according to claim 2, characterized in that each of said pliers comprise an axially sprung rotatable head with three glass tube gripping jaws internally provided with a respective roller and pivoted on a shank having a pin slidable in a cam-shaped groove.

7. A machine according to any one of claims 2, 3, 4, 5, or 6, characterized in that at least one of said burners is mounted on a semicircular orbit with respect to the machine center.

* * * * *